(12) United States Patent
Schwend et al.

(10) Patent No.: US 9,323,416 B2
(45) Date of Patent: Apr. 26, 2016

(54) MANAGING LINKED CONTACT RECORDS CONTAINING INFORMATION FROM MULTIPLE SOURCE RECORDS

(75) Inventors: Diana J. Schwend, Seattle, WA (US); Robert Emmett McCann, Seattle, WA (US); Benjamin John Turner, Seattle, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 570 days.

(21) Appl. No.: 13/362,139

(22) Filed: Jan. 31, 2012

(65) Prior Publication Data
US 2013/0198680 A1 Aug. 1, 2013

(51) Int. Cl.
G06F 3/048 (2013.01)
G06F 3/0481 (2013.01)
G06Q 10/10 (2012.01)

(52) U.S. Cl.
CPC ............. G06F 3/0481 (2013.01); G06Q 10/10 (2013.01)

(58) Field of Classification Search
CPC . G06F 3/0481; G06F 3/0482; G06F 3/04817; G06F 9/4443; G06Q 10/10
USPC .......................................... 715/781, 810, 739
See application file for complete search history.

(56) References Cited

U.S. PATENT DOCUMENTS

| 7,734,577 B2 | 6/2010 | Dunn et al. | |
| 7,788,296 B2 * | 8/2010 | D'Albora et al. | 707/805 |
| 2005/0091250 A1 * | 4/2005 | Dunn et al. | 707/101 |
| 2005/0091284 A1 | 4/2005 | Weissman et al. | |
| 2006/0026198 A1 | 2/2006 | Emery et al. | |
| 2006/0085483 A1 | 4/2006 | Mooney et al. | |
| 2006/0184584 A1 | 8/2006 | Dunn et al. | |
| 2007/0143364 A1 | 6/2007 | Chen et al. | |
| 2008/0052307 A1 | 2/2008 | Dunn et al. | |
| 2009/0043844 A1 * | 2/2009 | Zimmet et al. | 709/204 |
| 2009/0143052 A1 | 6/2009 | Bates et al. | |
| 2009/0157717 A1 | 6/2009 | Palahnuk et al. | |
| 2009/0177744 A1 * | 7/2009 | Marlow et al. | 709/204 |
| 2010/0076926 A1 | 3/2010 | Lecciso et al. | |
| 2010/0138764 A1 * | 6/2010 | Hatambeiki et al. | 715/765 |
| 2011/0004561 A1 * | 1/2011 | Shahine et al. | 705/319 |
| 2011/0055234 A1 | 3/2011 | Miettinen | |
| 2011/0087747 A1 | 4/2011 | Hirst et al. | |
| 2011/0113073 A1 | 5/2011 | Chang | |
| 2011/0145099 A1 * | 6/2011 | Berger et al. | 705/27.1 |
| 2011/0167114 A1 | 7/2011 | Blanchard, III et al. | |
| 2011/0196884 A1 | 8/2011 | Gandhi et al. | |
| 2011/0197163 A1 * | 8/2011 | Jegal et al. | 715/811 |

(Continued)

OTHER PUBLICATIONS

"Xobni User Manual," Sep. 28, 2010, v1.9.5, pp. 1-39.*

(Continued)

*Primary Examiner* — Kieu Vu
*Assistant Examiner* — Asteway T Gattew
(74) *Attorney, Agent, or Firm* — Thomas Grzesik; Fleit Gibbons Gutman Bongini & Bianco P.L.

(57) ABSTRACT

The present disclosure provides for management of linked contact records containing information from multiple source records. User interfaces and methodologies for displaying and managing a linked contact record of a contact allow the linked contact record to be readily and selectively managed. A user can interact with a user interface in order to selectively add, remove, and re-store links to a linked contact record of a contact.

37 Claims, 15 Drawing Sheets

(56) References Cited

U.S. PATENT DOCUMENTS

| | | | |
|---|---|---|---|
| 2011/0258159 A1 | 10/2011 | Mitchell | |
| 2012/0054673 A1* | 3/2012 | Kim et al. | 715/784 |
| 2012/0198348 A1* | 8/2012 | Park | 715/739 |
| 2013/0006924 A1* | 1/2013 | Logan et al. | 707/609 |
| 2013/0047089 A1* | 2/2013 | Kulathungam | 715/739 |
| 2013/0080914 A1* | 3/2013 | Souza et al. | 715/752 |
| 2013/0138720 A1* | 5/2013 | Ehrenberg et al. | 709/203 |

OTHER PUBLICATIONS

"Digsby—Getting Started," Nov. 28, 2011, wiki.digsby.com, pp. 1-14.*
"Android Contacts—Link and Unlink / Join and Separate," Dec. 2010, http://www.stdi.com/stdi/home.nsf/ws/AndroidContact, pp. 1-5.*
"Android Contacts—Link and Unlink," Dec. 21, 2010, http://web.archive.org/web/20120126034624/http://www.stdi.com/stdi/home.nsf/ws/AndroidContact, 4 pages.*
"Windows Phone 7 (WP7) Tips and Tricks Part2," Nov. 12, 2010, https://www.youtube.com/watch?v=TL1xavXnPxY#t=23, 2 pages.*
Jack Wallen, "How to manage the contacts on your Android phone," Jan. 5, 2011, http://www.techrepublic.com/blog/smartphones/how-to-manage-the-contacts-on-your-android-phone/, 12 pages.*
"Add new item count to icon on button—Android," May 15, 2011, http://stackoverflow.com/questions/6011786/add-new-item-count-to-icon-on-button-android, 3 pages.*
Canadian Office Action dated Feb. 24, 2015, received for Canadian Application 2,766,457.

* cited by examiner

300

310
UPON SELECTION OF A LINKED CONTACT, DISPLAY IN A USER INTERFACE THE LINKED CONTACT RECORD AND A LINK ICON OF THE LINKED CONTACT RECORD

320
IN RESPONSE TO ACTIVATION OF THE LINK ICON OF THE LINKED CONTACT RECORD IN THE USER INTERFACE, ENTER A MANAGE MODE IN WHICH THE LINKED CONTACT CAN BE SELECTIVELY MANAGED

*FIG. 3*

MANAGING LINKED CONTACT RECORDS CONTAINING INFORMATION FROM MULTIPLE SOURCE RECORDS

BACKGROUND

Personal information manager (PIM) software applications are computer programs that allow a user to maintain and organize various types of personal information and which provide electronic mail (email) functionality. PIM software applications (or simply "PIM applications") typically maintain personal information in distinct information categories. The information categories that are maintained usually include an email message inbox, an email message outbox, a set of previously transmitted email messages or "sent items", an address book containing contact information, a scheduling calendar (or i.e. a set of appointments, notes, and a list of tasks to be completed). PIM applications may be designed for execution by a wireless communication device.

In certain personal information management (PIM) applications, contact information about a user's contacts may be provided to the user via a user dashboard user interface. It is often the case that information about a particular contact, whether an individual or a company, can and often does come from many sources, including social network sites that have a vast amount of contact information about people and companies. It would be useful to provide a way to effectively, selectively and easily manage the presentation of contact information from widely disparate sources to users of such applications.

BRIEF DESCRIPTION OF THE DRAWINGS

Example embodiments of the present disclosure will be described below with reference to the included drawings such that like reference numerals refer to like elements and in which:

FIG. 3 is a flowchart of a method of managing a linked contact record, in accordance with various example embodiments of the present disclosure.

DETAILED DESCRIPTION

Figure 1:
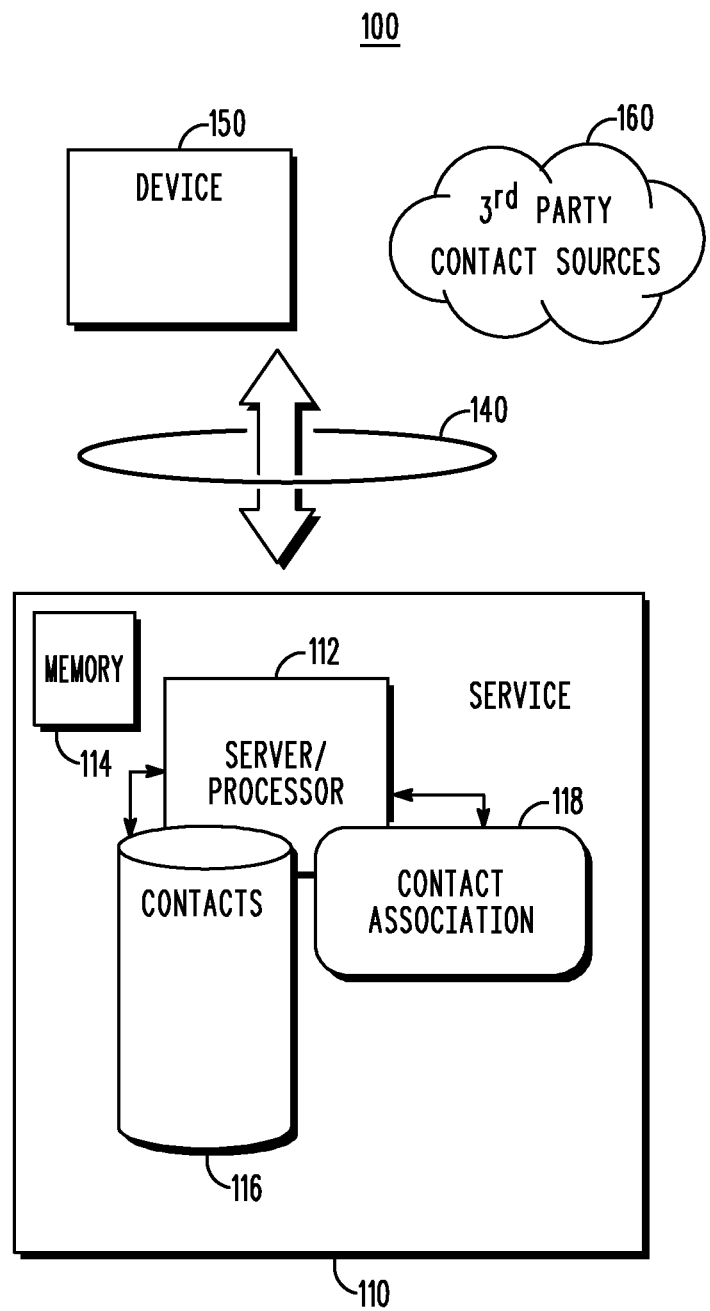
FIG. 1 is a block diagram of a communications system, in accordance with various example embodiments of the present disclosure.

In accordance with the various example embodiments presented herein, management of linked contact records containing information from multiple source records is provided. User interfaces and methodologies for displaying and managing a linked contact record of a contact allow the linked contact record to be readily and selectively managed. A user can interact with a user interface in order to selectively add, remove, and re-store links to a linked contact record of a contact. The user interface is intuitive and easy to use.

Therefore, in accordance with an example embodiment of the present disclosure, there is provided a method of managing a linked contact record representative of contact information from multiple sources, including: after receiving selection of a linked contact record of a contact, that includes a number of linked source contact records of the contact, displaying in a user interface the linked contact record and a visual indicator that the linked contact record has a linked status; and after receiving an input to enter a manage mode, entering the manage mode in which the linked contact record of the contact can be selectively managed.

In accordance with another example embodiment of the present disclosure, there is provided a system having a processor and a contacts database coupled to the processor in which contact information about a number of contacts is stored, the processor and contacts database configured as follows. After receiving selection of a linked contact record of a contact, that includes a plurality of linked source contact records of the contact, the linked contact record and a visual indicator that the linked contact record has a linked status are displayed in a user interface. After receiving an input to enter a manage mode, the manage mode in which the linked contact record of the contact can be selectively managed is entered.

In accordance with a further example embodiment of the present disclosure, there is provided a non-transitory computer-readable medium having computer-executable instructions for causing a server having a processor and associated memory to implement the following. After receiving selection of a linked contact record of a contact, that includes a plurality of linked source contact records of the contact, displaying in a user interface the linked contact record and a visual indicator that the linked contact record has a linked status. After receiving an input to enter a manage mode, entering the manage mode in which the linked contact record of the contact can be selectively managed.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

Referring now to FIG. 1, a block diagram of a distributed communications system 100 that includes a service 110 that may be provided with contact information from third party contact sources 160 and is in communications with communication device 150 via communications network 140 as shown. As shown, third party contact sources 160 may provide information about contacts to the communication device 150 and/or the service 110. Although communications network 140 may be the World Wide Web or Internet, and in fact search various servers/processors 112 associated with service 110 may reside on the World Wide Web, it is understood that the service servers and one or more communication devices 150 may be coupled together by various types of networks, such as local area networks (LANs), other wide area networks (WANs) and regional networks accessed over telephone lines, such as commercial information services. In an example embodiment, service 110 may be included in the communication device 150.

Communication device 150 is a two-way electronic communication device having at least data and possibly also voice communication capabilities, and the capability to communicate with other communication devices or computer systems, for example, via the Internet. A communication device 150 may further be a mobile or handheld electronic device and may be wireless. Depending on the functionality provided by the communication device 150, in the various examples described herein, the device may be a data communication device, a multiple-mode communication device configured for both data and voice communication, a smartphone, a mobile telephone or a personal digital assistant PDA (personal digital assistant) enabled for wireless communication, or a computer system with a wireless modem. Other examples of communication devices 150 include mobile, or handheld, wireless communication devices such as pagers, cellular phones, cellular smart-phones, wireless organizers, wirelessly enabled notebook computers, tablet computing devices, and so forth. Communication device 150 may also be a portable electronic device without wireless communication capabilities, such as a handheld electronic game device, digital photograph album, digital camera, or other device.

Service 110 may include one or more servers or processors 112, a memory 114, a contacts database 116, and a contact association element 118, as shown. The service 110 may be provided by a data center, for example, that uses a large number of servers/processors 112 in racks. Server 112 of service 110 may have a number of different servers, with each server having one or more processors, contacts databases 116, and memories 114. The server 112 may be by way of example, and not limitation, a Network Operations Center (NOC), such as a Blackberry Enterprise Server (BES), or other central server arrangement that can combine many social networks and manage them collectively. Load balancing between various servers 112 may be employed in example configurations.

While contacts database 116 encompasses the functionality of a contacts database, it is understood that such databases may reside within one or many databases to which the service 110 has access. A contacts database 116 stores contact information available on the Internet, for example. The contacts stored in the contacts database may be acquired from a communication device 150 directly (for example, from a PIM application executing on the communication device), from a third party contact source 160, such as social network sites that have a vast amount of contact information, or from a user of the communication device 150 electing to provide certain of the user's contacts stored on the device. The service 110 can also directly acquire contact information and store them in the contacts database 116. As will be discussed, the user of the communication device 150 may be presented with an option to manage a linked contact record of a contact made up of two or more linked source contact records.

In keeping with various examples, service 110 can acquire contacts from a user's communication device 150 and/or various third party contact sources 160. The contact association element 118 of service 110 associates contact information with a user's contacts. User contacts may be obtained directly from the communication device 150. Contact information may also be obtained from a variety of sources on the Internet, including but not limited to GMAIL, Google contacts, social network contacts (such as Facebook, Twitter, Linked-In, etc.). This contact association is performed by contact association element 118 of the service 110.

The user can decide whether to opt-in to the service provided by service 110 or it may be provided automatically. A PIM application that executes on the communication device 150 may prompt the user to decide whether to opt-in, or this may occur when the user activates the visual indicator of a linked contact record in order to manage the linked contact record, which may include changing, adding to, or deleting one or more source contact records of the linked contact record. This method is further illustrated in the flowchart of FIG. 3 and the graphical user interfaces of FIGS. 4-15 of the drawings, described below.

Figure 2:
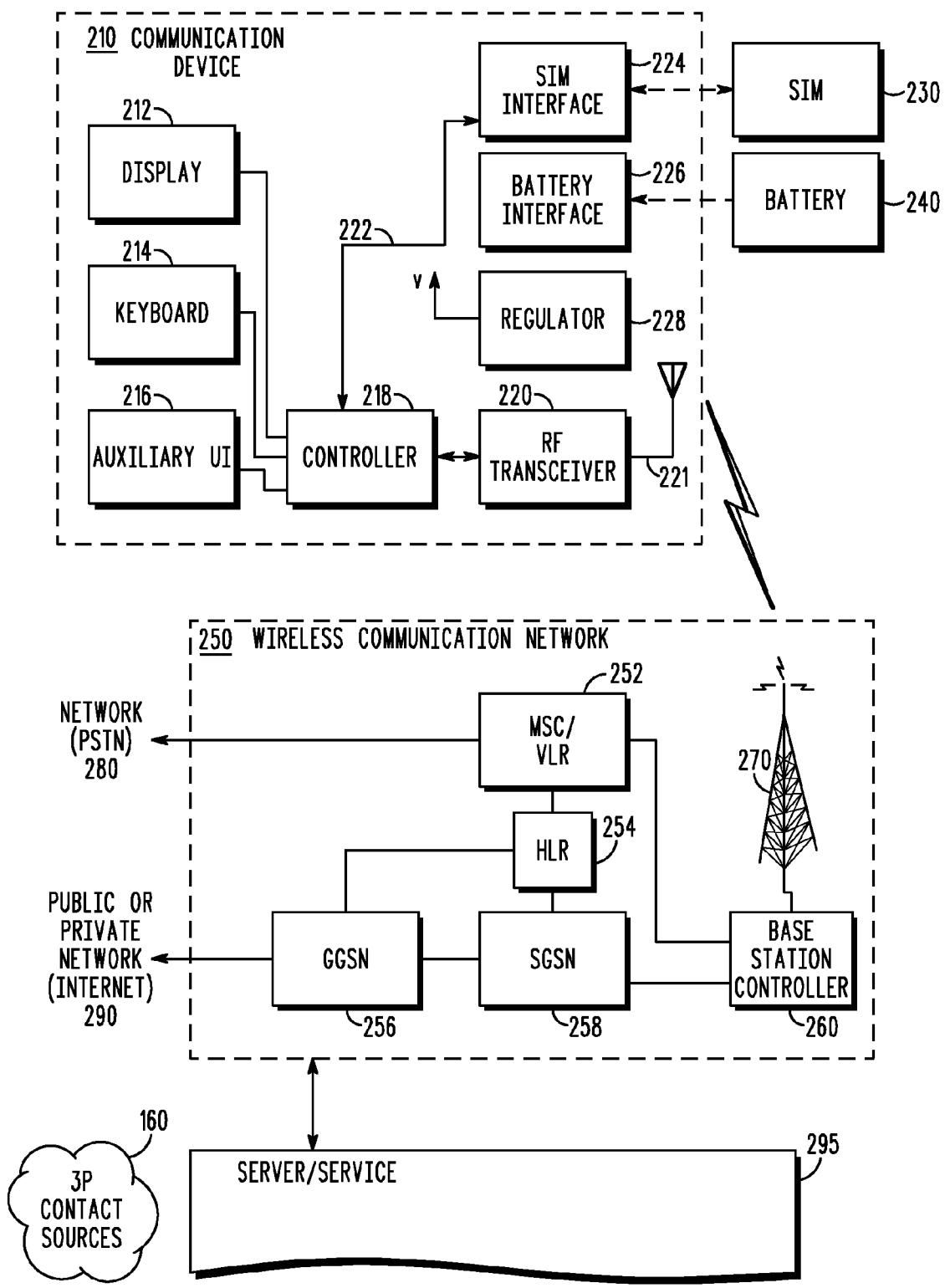
FIG. 2 is a block diagram of a wireless communication system, in accordance with various example embodiments of the present disclosure.

To illustrate an example embodiment system architecture, FIG. 2 shows a block diagram of a wireless communication system 200 which includes a communication device 210, such as a wireless or mobile communication device, which communicates through a wireless communication network 250, to a server 295. An example wireless implementation of communication device 210 and a wireless communication network 250 with which it communicates will now be discussed. Communication device 210 has a display 212, a keyboard 214, and perhaps one or more auxiliary user interfaces (UI) 216, each of which are coupled to a controller 218. Controller 218 is also coupled to radio frequency (RF) transceiver circuitry 220 and an antenna 221. Controller 218 may be embodied as a central processing unit (CPU) which runs operating system software in a memory component (not shown). Controller 218 will normally control overall operation of communication device 210, whereas signal processing operations associated with communication functions may be performed in RF transceiver circuitry 220. Controller 218 interfaces with display 212 to display received information, stored information, user inputs, and the like. Keyboard 214, which may be a telephone type keypad or full alphanumeric keyboard, is normally provided for entering data for storage in communication device 210, information for transmission to wireless communication network 250, a telephone number to place a telephone call, commands to be executed on electronic communication device 210, and possibly other or different user inputs.

Communication device 210 sends communication signals to and receives communication signals from wireless communication network 250 over a wireless link via antenna 221. RF transceiver circuitry 220 performs functions similar to those of a tower station 270 and a base station controller (BSC) 260, including for example modulation/demodulation and possibly encoding/decoding and encryption/decryption. It is also contemplated that RF transceiver circuitry 220 may perform certain functions in addition to those performed by BSC 260. It will be apparent to those skilled in art that RF transceiver circuitry 220 will be adapted to particular wireless network or networks in which communication device 210 is intended to operate. When communication device 210 is fully operational, an RF transmitter of RF transceiver circuitry 220 is typically keyed or turned on only when it is sending to network, and is otherwise turned off to conserve resources. Similarly, an RF receiver of RF transceiver circuitry 220 is typically periodically turned off to conserve power until it is needed to receive signals or information (if at all) during designated time periods.

Communication device 210 includes a battery interface 226 for receiving one or more rechargeable batteries 240. Battery 240 provides electrical power to electrical circuitry in communication device 210, and battery interface 226 provides for a mechanical and electrical connection for battery 240. Battery interface 226 is coupled to a regulator 228 which regulates power to the device. Communication device 210 may be a handheld portable communication device, which includes a housing (e.g. a plastic housing) which carries and contains the electrical components of communication device 210 including battery 240. Communication device 210 operates using a Subscriber Identity Module (SIM) 230 which is connected to or inserted in communication device 210 at a SIM interface 224. SIM 230 is one type of a conventional "smart card" used to identify an end user (or subscriber) of communication device 210 and to personalize the device, among other things. Without SIM 230, the communication device terminal is not fully operational for communication through wireless communication network 250. By inserting SIM 230 into communication device 210, an end user can have access to any and all of his/her subscribed services. SIM 230 generally includes a processor and memory for storing information. Since SIM 230 is coupled to SIM interface 224, it is coupled to controller 218 through communication lines 222. In order to identify the subscriber, SIM 230 contains some user parameters such as an International Mobile Subscriber Identity (IMSI). An advantage of using SIM 230 is that end users are not necessarily bound by any single physical mobile communication device. SIM 230 may store additional user information for the communication device 210 as well, including datebook (or calendar) information and recent call information.

Communication device 210 may consist of a single unit, such as a data communication device, a cellular telephone, a multiple-function communication device with data and voice communication capabilities, a personal digital assistant (PDA) enabled for wireless communication, or a computer incorporating an internal modem. Communication device 210 may be a handheld portable communication device which includes a housing (e.g. a plastic housing) which carries and contains the electrical components of communication device 210. Alternatively, communication device 210 may be a multiple-module unit including a plurality of separate components, including but in no way limited to a computer or other device connected to a wireless modem. In particular, for example, RF transceiver circuitry 220 and antenna 221 may be implemented as a radio modem unit that may be inserted into a port on a laptop computer. In this case, the laptop computer would include display 212, keyboard 214, one or more auxiliary UIs 216, and controller 218 embodied as the computer's CPU. It is also contemplated that a computer or other equipment not normally capable of wireless communication may be adapted to connect to and effectively assume control of RF transceiver circuitry 220 and antenna 221 of a single-unit device such as one of those described above.

Communication device 210 communicates in and through wireless communication network 250. Wireless communication network 250 may be a cellular telecommunications network. In an example embodiment, wireless communication network 250 is configured in accordance with General Packet Radio Service (GPRS) and a Global Systems for Mobile (GSM) technologies. Today, such a mobile communication device may further operate in accordance with Enhanced Data rates for GSM Evolution (EDGE) or Enhanced GPRS (EGPRS), as described in the Background section. In such environment, wireless communication network 250 includes a base station controller (BSC) 260 with an associated tower station 270, a Mobile Switching Center (MSC) 252, a Home Location Register (HLR) 254, a Serving General Packet Radio Service (GPRS) Support Node (SGSN) 258, and a Gateway GPRS Support Node (GGSN) 256. MSC 252 is coupled to BSC 260 and to a landline network, such as a Public Switched Telephone Network (PSTN) 280. SGSN 258 is coupled to BSC 260 and to GGSN 256, which is in turn coupled to a public or private data network 290 (such as the Internet). HLR 254 is coupled to MSC 252, SGSN 258, and GGSN 256.

Station 270 is a fixed transceiver station, and station 270 and BSC 260 may be referred to as transceiver equipment. The transceiver equipment provides wireless network coverage for a particular coverage area commonly referred to as a "cell". The transceiver equipment transmits communication signals to and receives communication signals from mobile communication devices within its cell via station 270. The transceiver equipment normally performs such functions as modulation and possibly encoding and encryption of signals to be transmitted to the mobile communication device in accordance with particular, usually predetermined, communication protocols and parameters, under control of its controller. The transceiver equipment similarly demodulates and possibly decodes and decrypts, if necessary, any communication signals received from communication device 210 within its cell. Communication protocols and parameters may vary between different networks. For example, one network may employ a different modulation scheme and operate at different frequencies than other networks.

The wireless link shown in communication system 200 of FIG. 2 represents one or more different channels, typically different radio frequency (RF) channels, and associated protocols used between wireless communication network 250 and communication device 210. An RF channel is a limited resource to be conserved, due to limits in overall bandwidth and a limited battery power of communication device 210. Those skilled in art will appreciate that a wireless network in actual practice may include hundreds of cells, each served by a station 270 (i.e. or station sector), depending upon desired overall expanse of network coverage. All pertinent components may be connected by multiple switches and routers (not shown), controlled by multiple network controllers.

For all communication devices 210 registered with a network operator, permanent data (such as communication device 210 user's profile) as well as temporary data (such as communication device's 210 current location) are stored in HLR 254. In case of a voice call to communication device 210, HLR 254 is queried to determine the current location of communication device 210. A Visitor Location Register (VLR) of MSC 252 is responsible for a group of location areas and stores the data of those mobile communication devices that are currently in its area of responsibility. This includes parts of the permanent communication device data that have been transmitted from HLR 254 to the VLR for faster access. However, the VLR of MSC 252 may also assign and store local data, such as temporary identifications. Optionally, the VLR of MSC 252 can be enhanced for more efficient co-ordination of GPRS and non-GPRS services and functionality (e.g. paging for circuit-switched calls which can be performed more efficiently via SGSN 258, and combined GPRS and non-GPRS location updates).

Serving GPRS Support Node (SGSN) 258 is at the same hierarchical level as MSC 252 and keeps track of the individual locations of communication devices. SGSN 258 also performs security functions and access control. Gateway GPRS Support Node (GGSN) 256 provides interworking with external packet-switched networks and is connected with SGSNs (such as SGSN 258) via an IP-based GPRS backbone network. SGSN 258 performs authentication and cipher setting procedures based on algorithms, keys, and criteria (e.g. as in existing GSM). In conventional operation, cell selection may be performed autonomously by communication device 210 or by the transceiver equipment instructing communication device 210 to select a particular cell. Communication device 210 informs wireless communication network 250 when it reselects another cell or group of cells, known as a routing area.

In order to access GPRS services, communication device 210 first makes its presence known to wireless communication network 250 by performing what is known as a GPRS "attach". This operation establishes a logical link between communication device 210 and SGSN 258 and makes communication device 210 available to receive, for example, pages via SGSN, notifications of incoming GPRS data, or SMS messages over GPRS. In order to send and receive GPRS data, communication device 210 assists in activating the packet data address that it wants to use. This operation makes communication device 210 known to GGSN 256; interworking with external data networks can thereafter commence. User data may be transferred transparently between communication device 210 and the external data networks using, for example, encapsulation and tunneling. Data packets are equipped with GPRS-specific protocol information and transferred between communication device 210 and GGSN 256.

Referring now to FIG. 3, a methodology in accordance with various example embodiments disclosed herein is provided. In flowchart 300, at Block 310 upon selection of a linked contact record of a contact formed from a number of linked source contact records of the contact, display in a user interface the linked contact record and a visual indicator of the linked contact record.

As will be shown, selection of the linked contact record may include selection of the linked contact record from a contact list displayed in the user interface. The linked contact record and the visual indicator of the linked contact record may be displayed in a contact detail panel of the user interface upon selection of the linked contact record. The visual indicator of the linked contact record may indicate the number of linked source contact records of the linked contact record, thus the display may further include displaying a badge of the visual indicator with the linked contact record in the contact details panel of the user interface, where the badge of the visual indicator indicates the number of linked source contact records of the linked contact record. As will be described, the visual indicator may be a link icon, as shown in subsequent figures, or the visual indicator may be highlighting, outlining, a blinking display, bolding, text, etc.

At Block 320, after receiving an input to enter a manage mode, such as by activation of the visual indicator, which may be a link icon, of the linked contact record in the user interface, a manage mode in which the linked contact record of the contact can be selectively managed is entered. Entering a manage mode may be accomplished in other ways, such as by selecting an option in a menu or by responding to a prompt to enter into a manage mode. A linked contact record can be selectively managed by adding linked, removing links, restoring linked to available but currently unlinked source records for a particular contact.

While the blocks including the methods are shown as occurring in a particular order, it will be appreciated by those skilled in the art that many of the blocks are interchangeable and can occur in different orders than that shown without materially affecting the end results of the methods.

Referring now to FIGS. 4 to 15, examples of a user's dashboard graphical user interface in accordance with various examples are provided. The user's dashboard graphical user interface may be implemented in a display of communications device 150 of FIG. 1 or the communication device 210 of FIG. 2.

Figure 4:
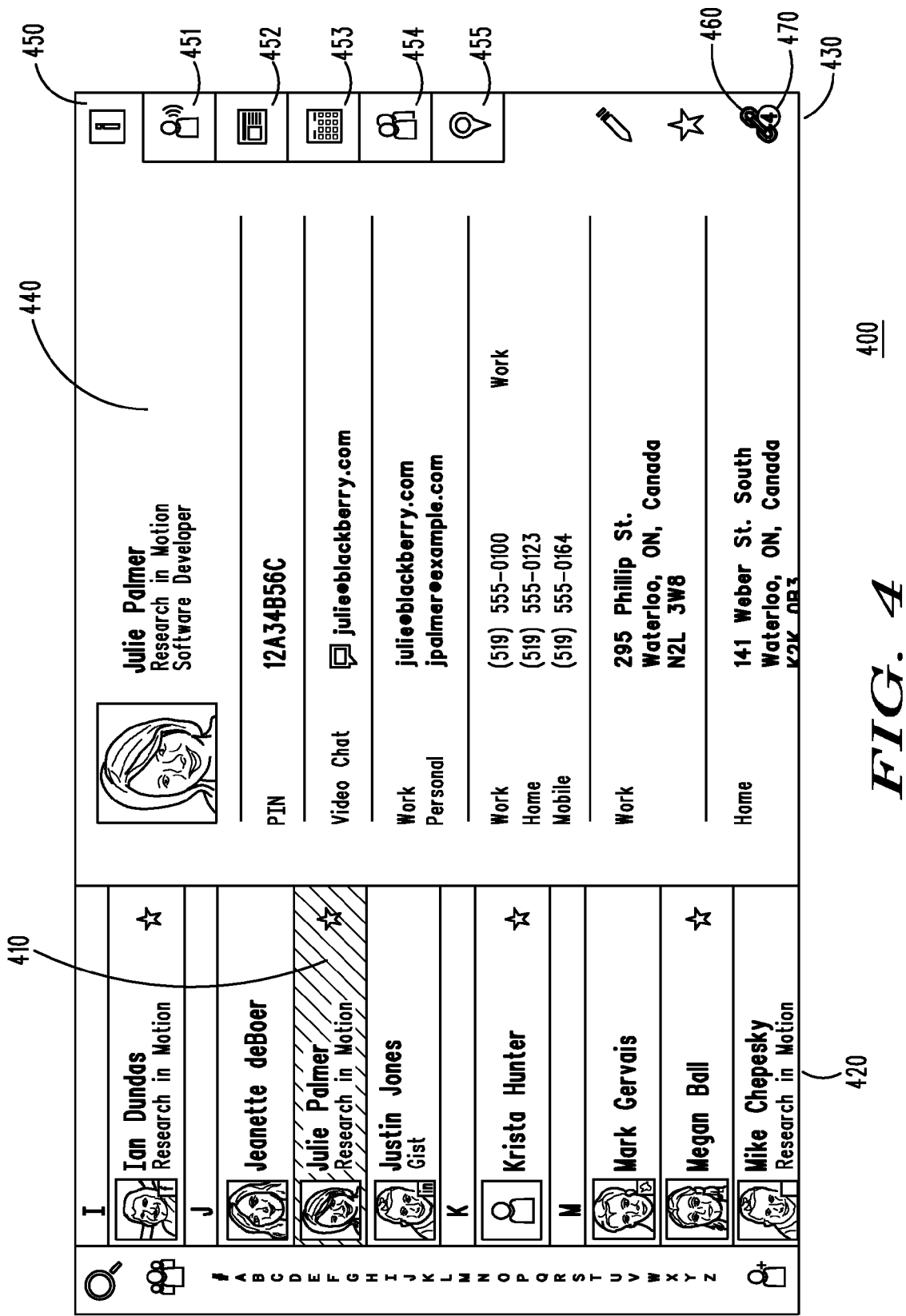
FIGS. 4 to 15 illustrate representative examples of user dashboard graphical user interfaces, in accordance with various example embodiments of the present disclosure.

In the example embodiment dashboard graphical user interface 400 of FIG. 4, presentation of information about one or more contacts is provided to a user. On a display, such as a touch screen display, of a communication device, the user's dashboard may include a number of contacts displayed in a contact list 420. The source of contacts displayed may include the user's contacts database, Facebook, etc., either stored on the user's device, for example, or obtained by the service 110 from any number of sources, such as social networking sites, for example, over the Internet. Selection of a given contact, in this example Julie Palmer, is indicated by the shaded area of selected linked contact record 410 in contact list 420, causes the linked contact record 440 of Julie Palmer to be displayed in a contact detail panel 430 of the touch screen display. After receiving selection of the details tab 450, the contact detail panel 430 displays information about this selected contact, including address, phone, chat, and email contact information. Other tabs 451, 452, 453, 454, 455, when selection is received, the contact details panel 420 might show status, news meetings, people, places, etc., depending upon the selected tab. Also presented in the contact detail panel 430 is a link icon 460 of the linked contact record 440 that indicates that this contact record is in fact a linked contact record 440 or has a linked status. (In other example embodiments, a visual indicator other than an icon may be used, such as highlighting or outlining the linked contact record 440, "blinking" the display of the linked contact record 440, making the text at the linked contact record 440 bold, providing text at or nearby the linked contact record 440 indicating its linked status, or other visual indicators.) Associated with link icon 460 is badge 470, which indicates the number of automatic or existing links that make up the linked contact record.

As shown, selection of a contact record may include selection of a selected linked contact record 410 from a contact list 240 displayed in the user interface. The linked contact record 440 and the link icon 460 of the linked contact record may be displayed in a contact detail panel 430 of the user interface upon selection of the linked contact record 410 from the contact list. The link icon 460 of the linked contact record may indicate the number of linked source contact records of the linked contact record, thus the display may further include displaying a badge 470 of the link icon with the linked contact record in the contact details panel of the user interface, where the badge of the link icon indicates the number of linked source contact records of the linked contact record. In this particular example, it can be seen that the Julie Palmer linked contact record is made up of four linked source contact records, as indicated by the badge 470 displaying "4."

Figure 5:
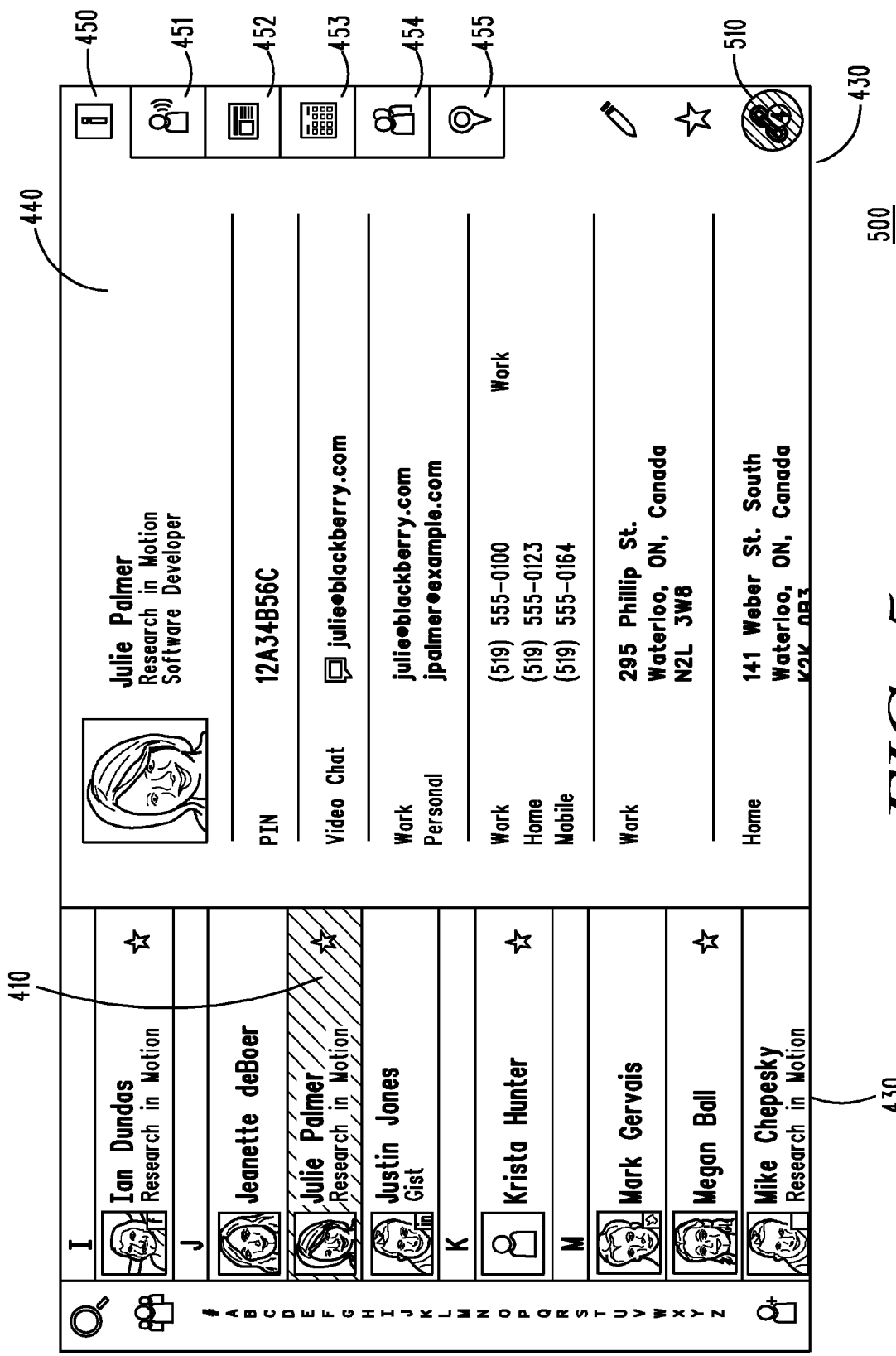

In FIG. 5, the example embodiment graphical user interface 500 again displays the selected linked contact record for Julie Palmer. In this screenshot, it can be seen that the link icon 460 of linked contact record 440 is activated by being selected on the touch screen of the display. This activation 510 is indicated by the cross-hatched circle surrounding link icon 460. In response to activation 510 of the link icon of the linked contact record in the user interface, a manage mode in which the linked contact record of the contact can be selectively managed can now be entered, as shown in FIGS. 6-15. Moreover, activation of the link icon in FIG. 5, results in entry into the manage mode, in which the linked source contacts that make up the linked contact record are displayed, and even source contact records that are not linked or no longer linked to the linked contact record may be displayed, as will be shown.

Figure 6:
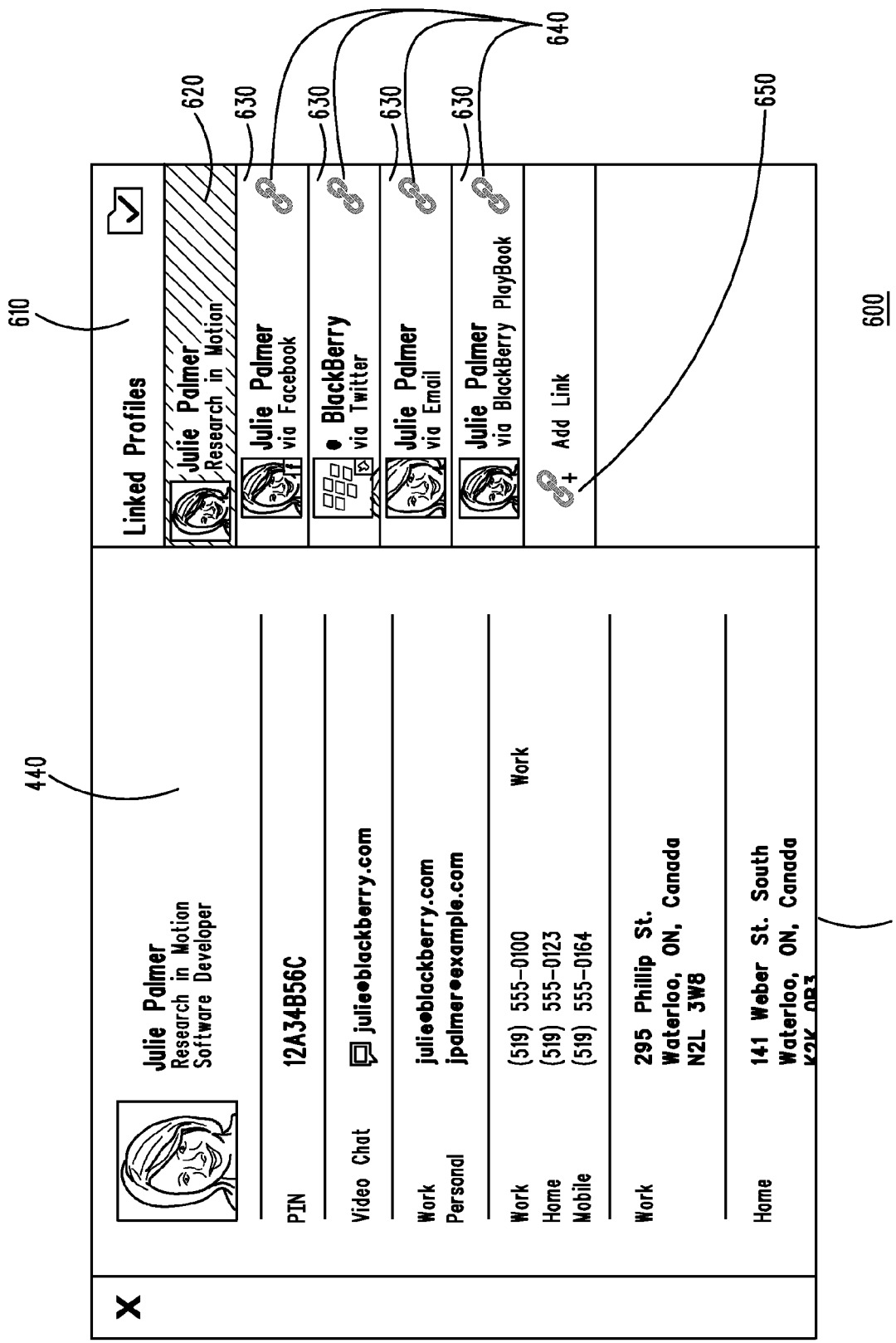
Figure 7:
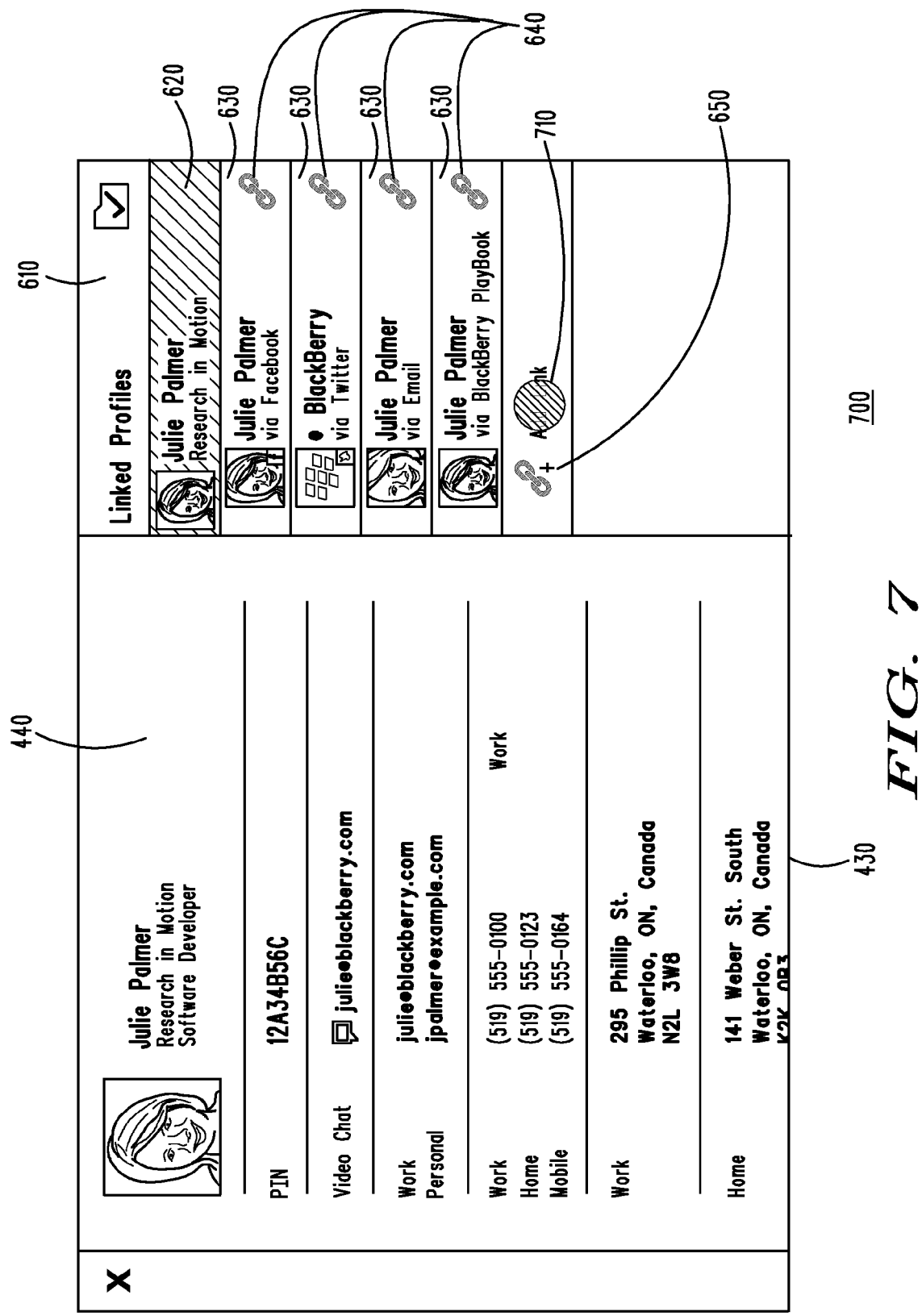

Referring now to FIG. 6, the example embodiment graphical user interface 600 illustrates the user interface in the manage mode. It can be seen that contact detail panel 430 in which the details of linked contact record 440 are displayed, has moved to the left of the touch screen display. Linked profile panel 610 is on the right side of the display and is labelled "Linked Profiles" in this example. The linked profile panel 610 displays a number of representations, including linked contact record representation 620, representative of the linked contact record 440, and a number, four in this example, of source contact record representations 630, representative of the four linked source contact records that make up linked contact record 440. Available contact pictures from each source contact record may also be illustrated in the source contact record representations 630, as shown. In addition, badges from the sources, such as social network sites or services such as Facebook and Twitter, may also be included in the source contact record representations 630, as shown. The source contact record representations 630 are shown as indented under linked contact record representation 620, although this is not a requirement.

In addition, the link status of a source contact record represented by a source contact record representation 630 is indicated by the link icon 640 of a particular source contact record representation. The link status of a source contact record to the linked contact record may be linked or unlinked. In this particular user interface 600, it can be seen that the linked status of each of the four source contact records represented by the source contact record representations 630 is indicated as "linked" by the link icons 640. It is noted that selection of the link icon 640 of any source contact representation 630 will allow the link status of selected source contact record to be changed, such as from linked to unlinked. This is further illustrated in FIG. 12.

Figure 13:
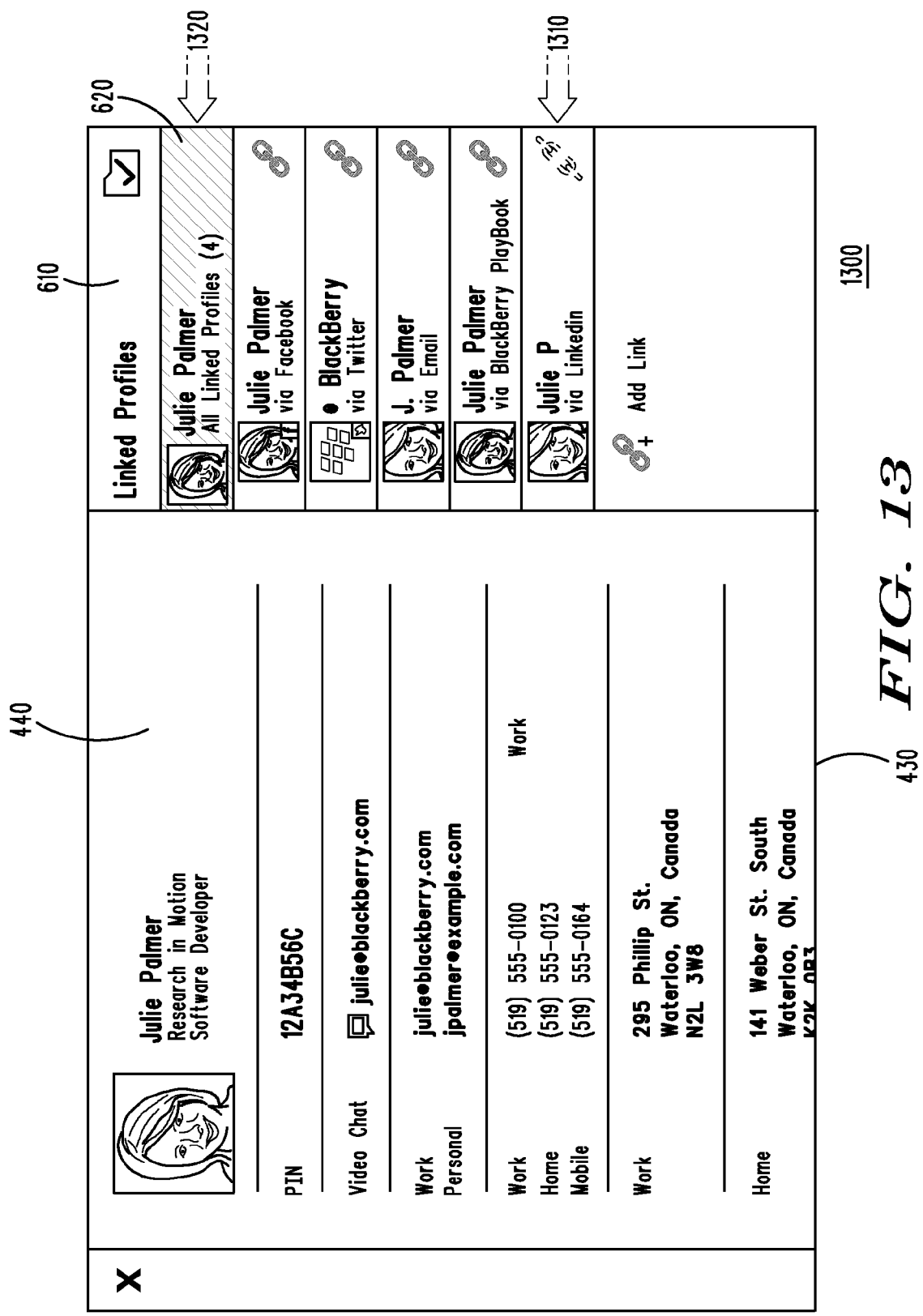

It can be seen that in the manage mode following activation of the visual indicator of a linked contact record, a linked contact record representation of the linked contact record and a number of source contact record representations corresponding to source contact records that make up the linked contact record are displayed in the user interface. Thus, for contacts with multiple linked profiles or data sources, the individual linked source contact records making up the linked contact record are displayed. The source contact records representations corresponding to the source contact records may be displayed as indented under the linked contact record representation, though this is not required. Further, as illustrated in this particular example, the linked contact record representation and the plurality of source contact record representations may be displayed in a linked profile panel of the user interface. Moreover, it can be seen for that each source contact record representation a source contact record representation link icon that indicates a link status of the source contact record represented by the source contact record representation to the linked contact record can be displayed as well. The link status of the source contact record representation link icon for each linked source contact record is linked in this particular example, but may also be unlinked, as is the case where a source contact record has been unlinked from the linked contact record, as shown in FIG. 13, for example.

The linked profile panel 610 additionally has an add link icon 650 that allows a source contact record to be added to the linked contact record, as will be described in connection with FIGS. 7 to 11. A user may select or tap the add link icon 650 to add a link in the manage mode. This selection or tap is represented by the hatched circular representation 710 over the "Add Link" term in the example embodiment shown in graphical user interface 700 of FIG. 7. As will be described, activation 710 of the add link icon 650 allows a user to search for additional source contact records of a particular contact to be added to a linked contact record for that contact.

Figure 8:
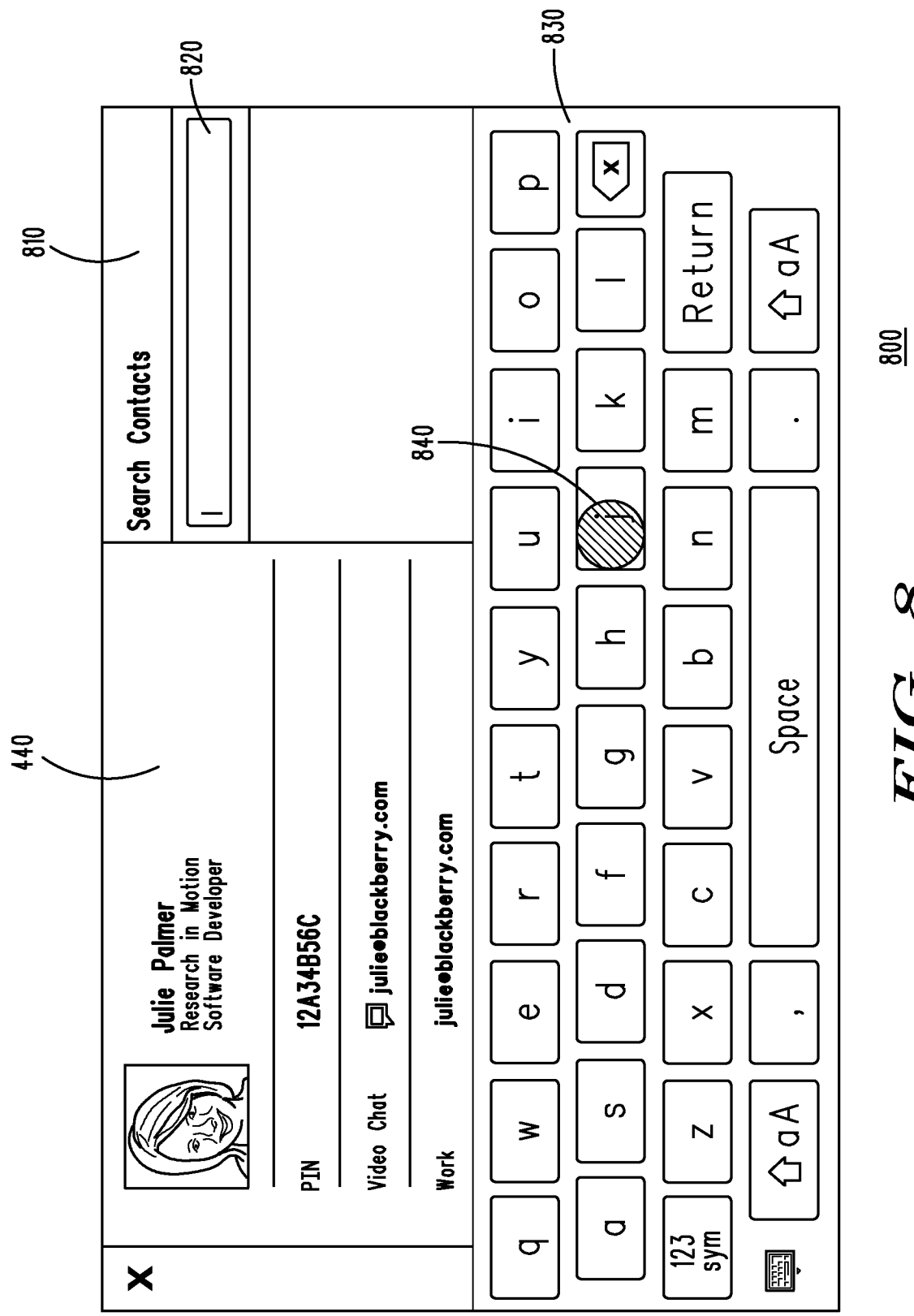

In FIG. 8, the example embodiment graphical user interface 800 illustrates that in response to selection or activation of the add link icon 650, a search window 810 with a search field 820 and a touch screen keypad 830 will appear in the user interface. The user may use the touch screen keypad 830 to enter a search term that will be used to search for other source contact records of the particular contact, in this case Julie Palmer, which may be added to the linked contact record for Julie Palmer if selected. FIG. 8, then, shows the search window provided to the user in the graphical user interface so that the user can enter a search. In particular, reference number 840 indicates a user selecting the letter "j" of touch screen keyboard 830, shown in the search field 820 of FIG. 9.

Figure 9:
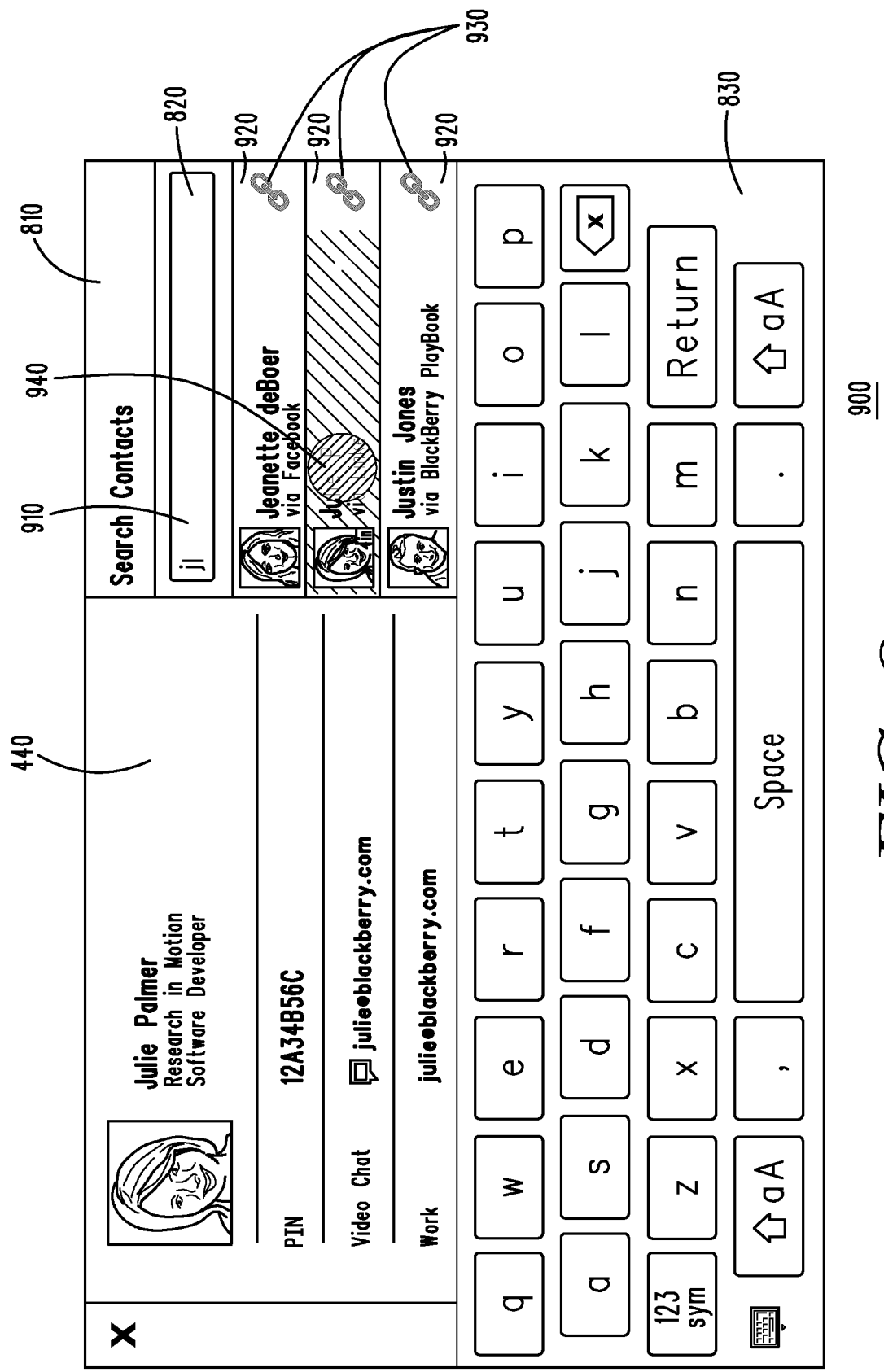

In the example embodiment graphical user interface 900 of FIG. 9, it can be seen that has a user starts to enter a search term 910 in search field 820, possible matches to the search term will be illustrated in the search window. In particular, three possible matches as listed as source contact record representations 920 each with a source contact record representation 930 indicating the link status of a particular source contact record that is represented. In this example, entry by the user of the search term "j" in search field 820 causes three source contact record representations to be listed: Jeanette deBoer, Julie P, and Justin Jones. Only one of the three, Julie P via LinkedIn, is a source contact record representation of a source record for the desired contact, Julie Palmer. The user can make a selection 940 of this source contact representation 920 to view the source contact record. LinkedIn® is an example of a social networking service/site and is referred to herein as LinkedIn.

Figure 10:
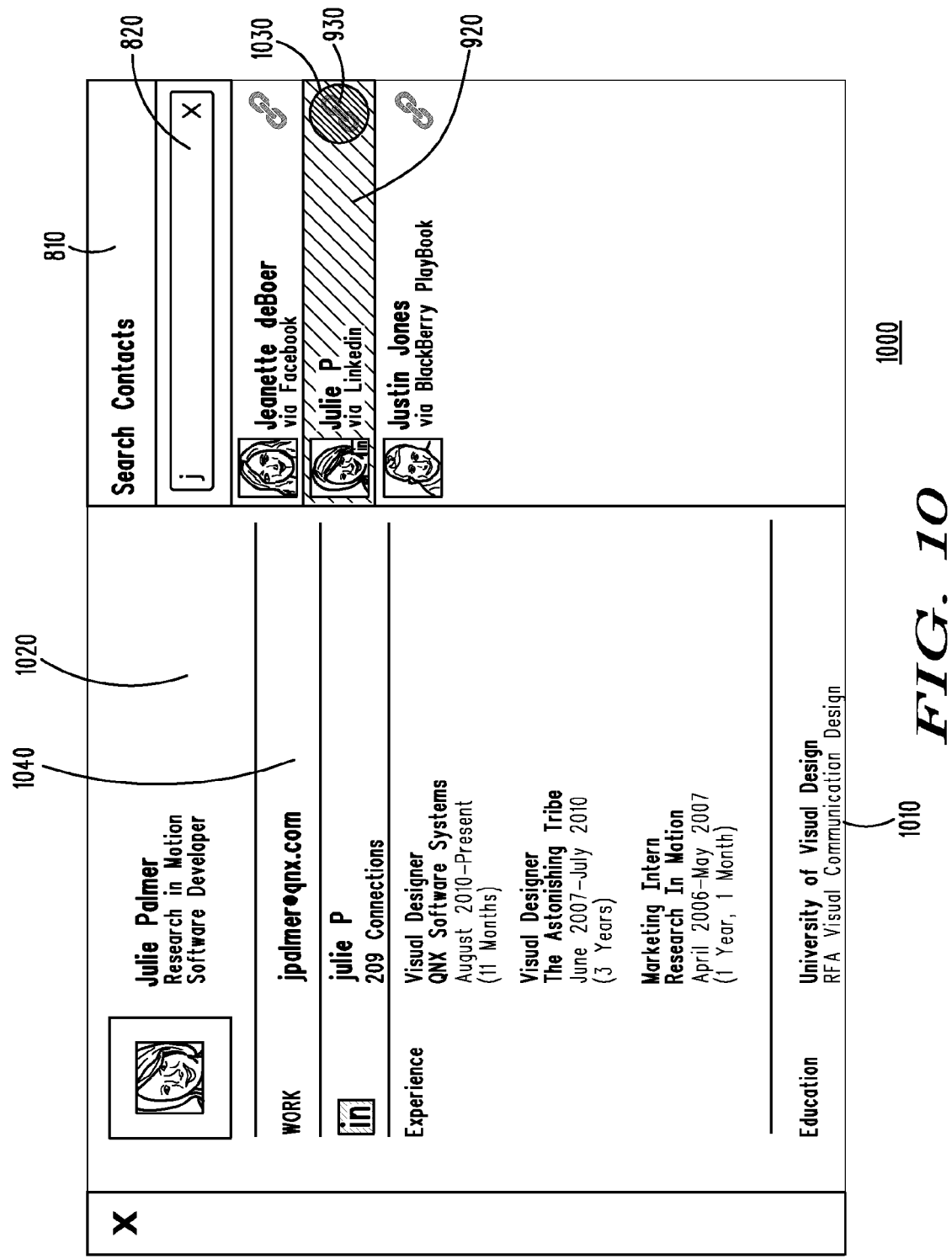

The selected source contact record, Julie P via LinkedIn, is viewed in the example embodiment graphical user interface 1000 of FIG. 10. In addition to search window 810, the user interface has a search result detail panel 1010 in which details 1020 of the selected new source contact record Julie P are displayed. It can be seen that the source contact record representation 920 of the selected new source contact record Julie P has a link icon that can be selected, as indicated by the encircled hatched area 1030, in order to add information of the new contact source record to the linked contact record. In this particular example, it can be seen that the work email address jpalmer@pnx.com, designated by 1040, is new information not currently in the linked contact record (440 of FIGS. 4 and 7) of Julie Palmer. Adding the new source contact source record makes it a new linked source contact record of the linked contact record for Julie Palmer.

The linked contact record for Julie Palmer will now have five linked source contact records, counting the newly added source contact record. The badge of the link icon for Julie Palmer will be updated to reflect five (5) links. This is illustrated in example embodiment graphical user interface 1100 of FIG. 11. In contact detail panel 430, a new linked contact record 1110 of the updated Julie Palmer linked contact is illustrated. It can be seen that the new work email address jpalmer@pnx.com, designated by 1040, in included in the new linked record. In linked profile panel 610, the linked contact record representation 620 of the new linked contact record 1110 now reflects five (5) linked profiles or records for this contact, which are displayed in linked profile panel 610 as source contact record representations 630. Each of the source contact record representations 630 has a link icon 640 conveying the linked status as "linked." An individual source contact record, such as the newly added Julie P via LinkedIn, may be selected by the user making a selection 1120 of the desired indicated source contact record representation 630, as shown.

Figure 11:
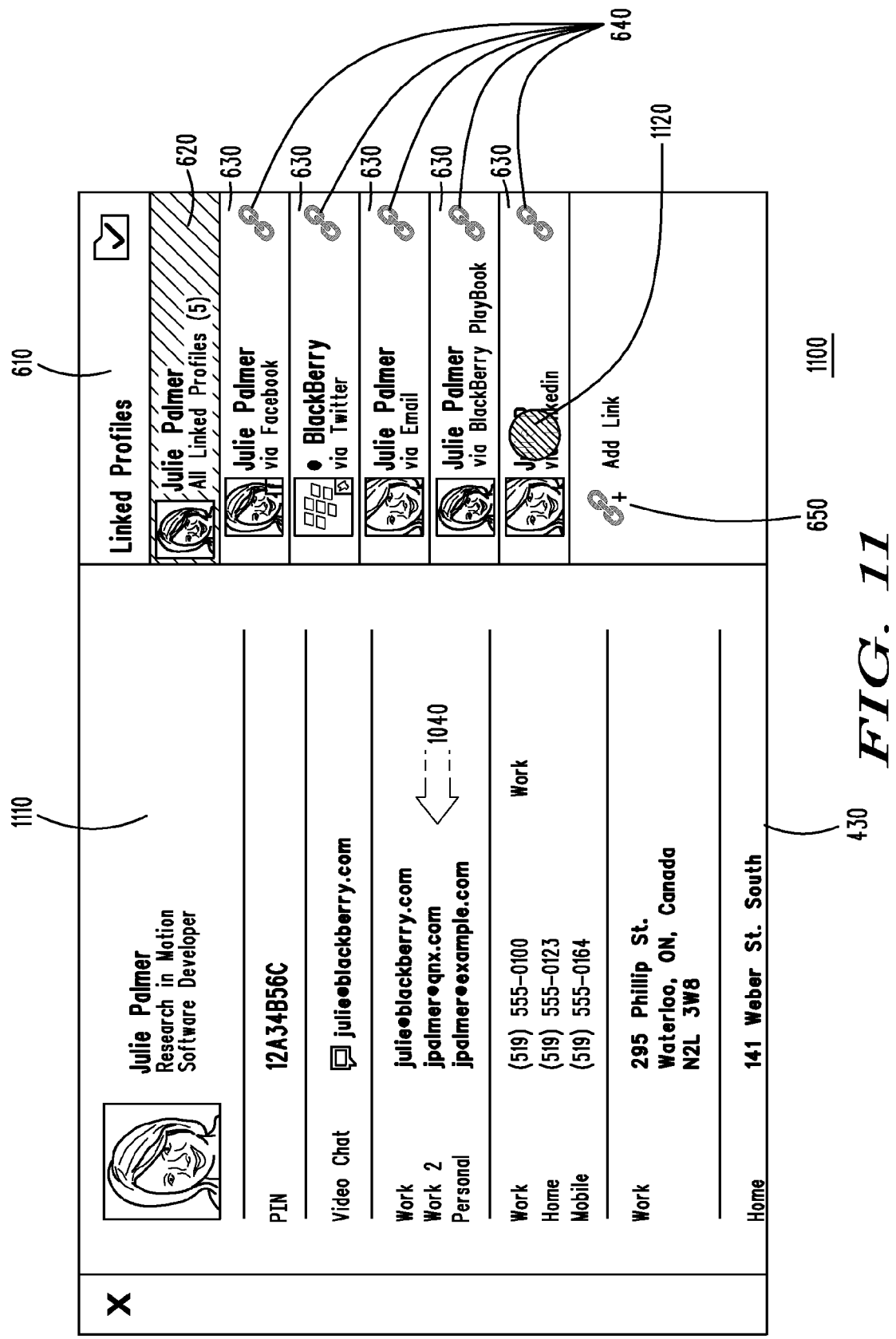
Figure 12:
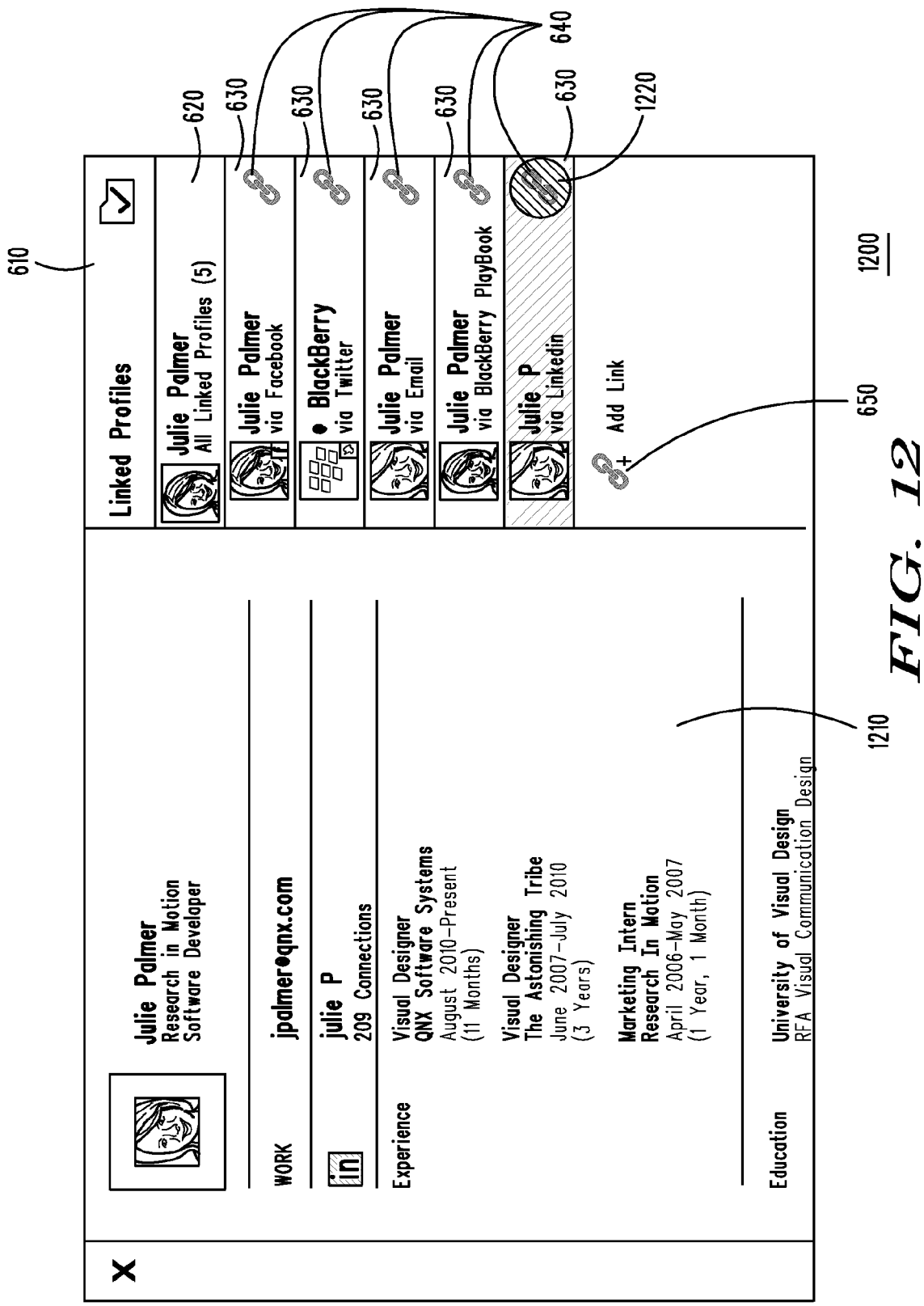

Selection 1120 of the Julie P via LinkedIn source contact record representation in FIG. 11 causes detail of the source contact record of the Julie P LinkedIn source record to be displayed 1210 as shown in the example embodiment graphical user interface 1200 of FIG. 12. The user can then select any of the link icons 640 of the listed source contact record representations 630 if desired to change the link status displayed by link icon 640. In this example, a user has made a selection 1220 the link icon 640 of the Julie P via LinkedIn source contact record representation 630. Since the status indicated by the link icon 640 of the Julie P via LinkedIn source contact record is linked, selecting the link icon will remove this source contact record from the linked contact record for Julie Palmer. This is illustrated by the unlinked status indicated by the broken link icon 1310 of example embodiment graphical user interface 1300 of FIG. 13 that is associated with Julie P via LinkedIn contact source record representation. Removing a link of a source contact record to the linked contact record does not delete the source contact record information; rather, it is just not linked to the linked contact record. Additionally, the number of linked profiles is updated from five to four (4), as indicated by reference number 1320. It can be seen that the linked contact record 440 of Julie Palmer displayed in contact detail panel 430 no longer contains work address jpalmer@pnx.com (1040 of FIG. 11) from the unlinked source record. A user may re-select the link icon associated with Julie P via LinkedIn at any time to re-link this source contact record to the linked contact record for Julie Palmer.

Figure 14:
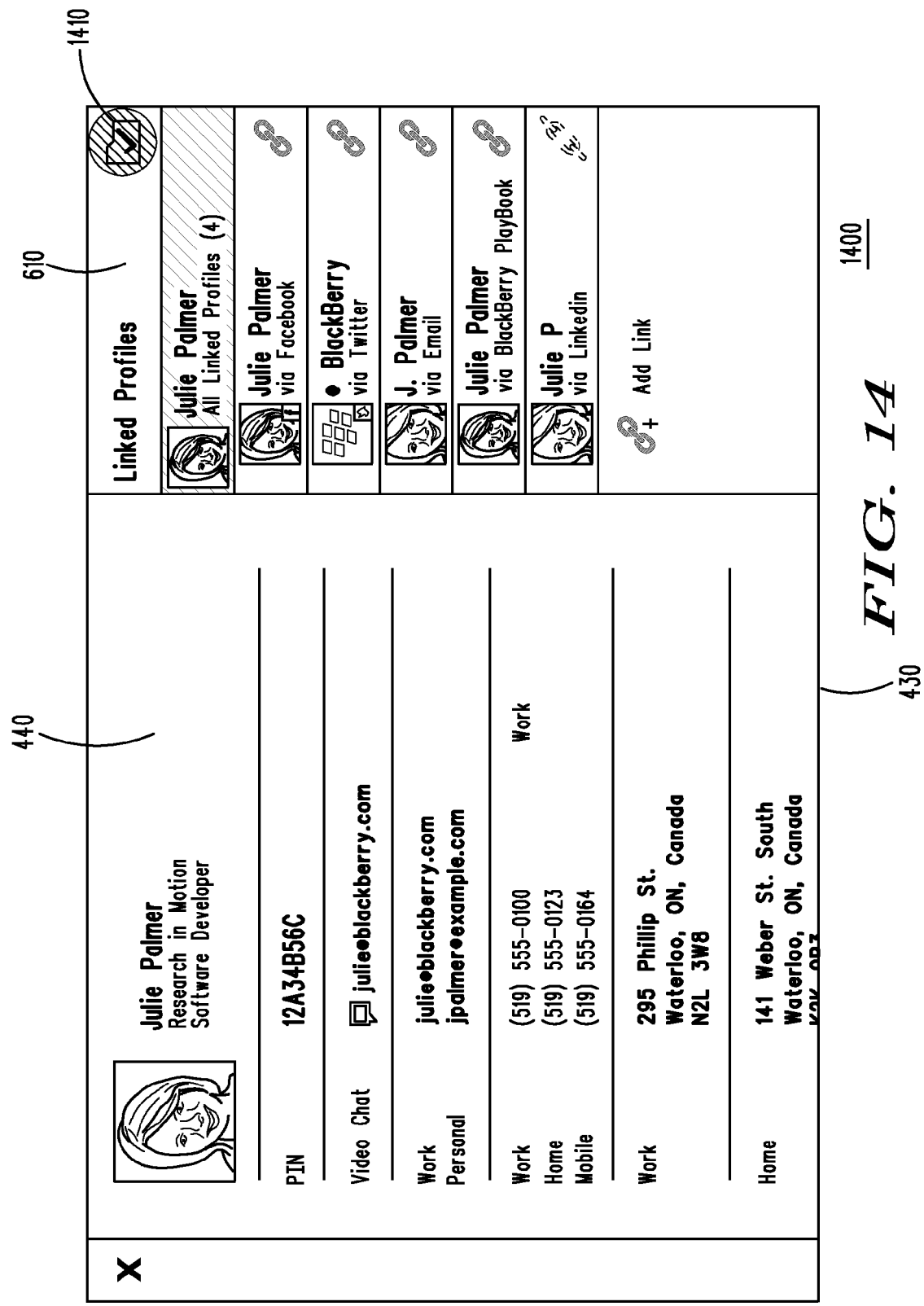
Figure 15:
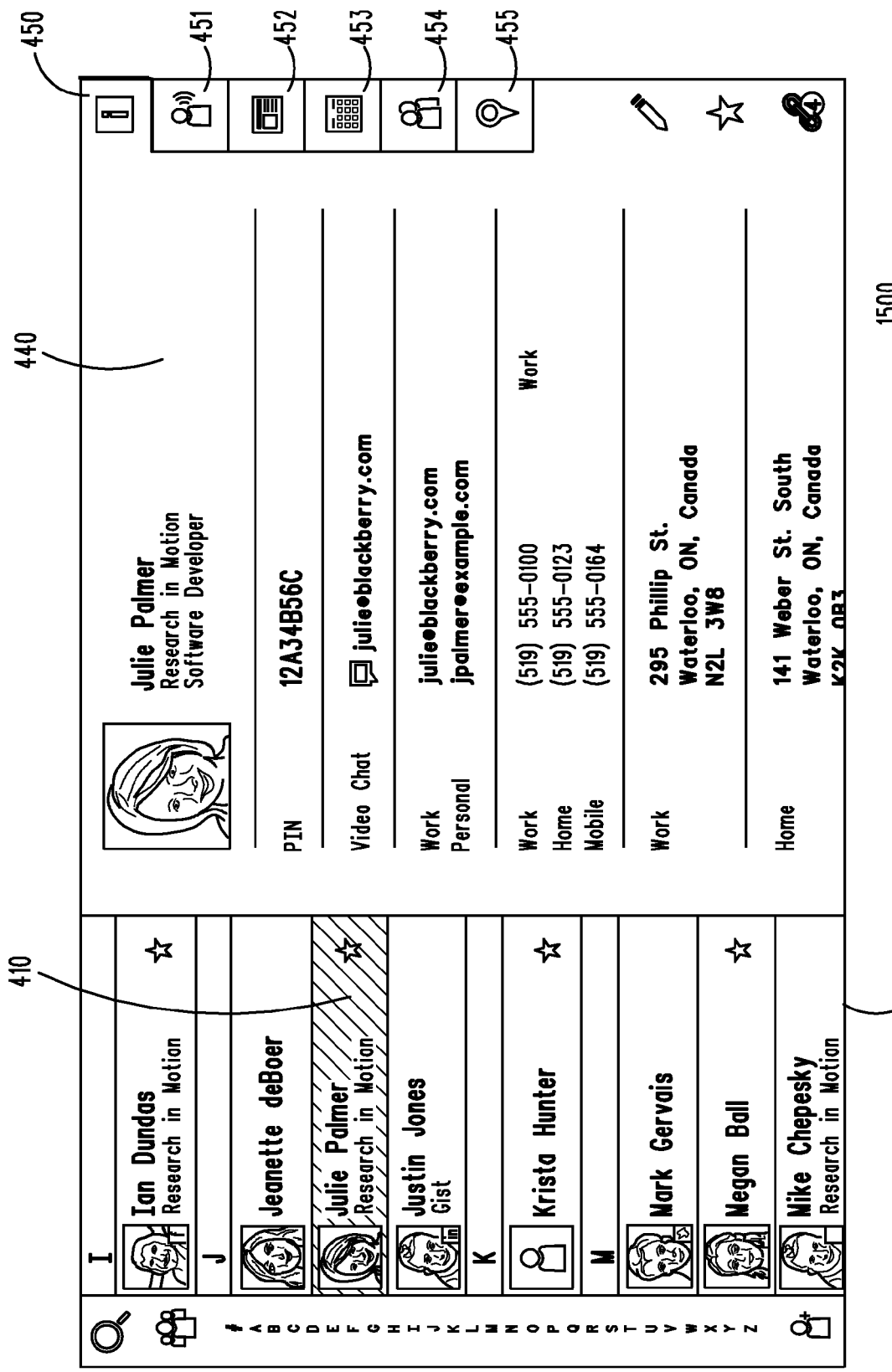

As illustrated in example embodiment graphical user interface 1400 of FIG. 14, the user may select the save icon 1410 to save the new linked contact record for Julie Palmer. The manage mode is exited, and the saved new linked contact record for Julie Palmer is displayed as saved linked contact record 440 with changes applied in contact detail panel 430 in graphical user interface 1500 of FIG. 15. Also shown in the non-manage mode is the selected linked contact record 410 in contact list 420.

It can be seen from the foregoing description that activation of an add link icon displayed in the user interface while in the manage mode, allows a user to search for and select a new source contact record of a particular contact so that a new linked contact record containing new information may be added to the linked contact record. In response to a received search term a search for additionally available source contact records for a contact is performed. In response to selection of the new source contact record returned by the search, a link to the new source contact record may be added to create a new linked contact record of the contact. The received search term and selection of the new source contact record may be received in a search window of the user interface as discussed above. Additionally, a visual indicator, such as a link icon, of the new linked contact record is updated to reflect linkage of the new source contact record in the new linked contact record of the contact. This may include updating a badge of the visual indicator of the new linked contact record.

In addition to adding a new link to a linked contact record, removing a link of a linked source contact record to the linked contact record while in the manage mode has been described. Removal of the link of the linked source contact record to the linked contact record may include in a linked profile panel of the user interface in which a linked contact record representation of the linked contact record and linked source contact record representations corresponding to the linked source contact records of the linked contact record are displayed with each linked source contact record representation having a displayed corresponding source contact record representation link icon that indicates the linked status of it respective linked source contact record. In response to selection of a source contact record representation link icon of a linked source contact record representation corresponding to a linked source contact record of the linked contact record, the link of the selected source contact record to the linked contact record is removed. Removing the link of the selected source contact record to the linked contact record does not delete the unlinked source contact record. Following removal of a link, the linked status of the unlinked source contact record is updated to unlinked, and the updated source contact record representation link icon displayed. Further, in response to selection of the updated source contact record representation link icon of the previously unlinked source contact record, the link to the linked contact record of the previously unlinked source contact record can be restored, and the linked status of the source contact record representation link icon of the restored source contact record updated to linked.

Saving changes to a linked contact record of a contact made in the manage mode creates a changed linked contact record. The changed linked contact record and a visual indicator of the changed linked contact record can be displayed, and may be displayed in a contact detail panel of the user interface. This may further include displaying a badge of the visual indicator of the changed linked contact record in the contact details panel of the user interface that indicates the number of source contact records that make up the changed linked contact record.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of managing a linked contact record representative of contact information from multiple source contacts comprising:
   after receiving selection of a linked contact record of a contact associated with a user, that includes a plurality of linked source contact records of the contact, displaying in a user interface the linked contact record and a visual indicator indicating that the linked contact record has a linked status and indicating the number of linked source contact records of the linked contact record, the visual indicator comprising a non-textual image and a numeric value that overlays the non-textual image; and after receiving an input to enter a manage mode, entering the manage mode in which the linked contact record of the contact can be selectively managed by adding or removing links to source contact records, and displaying in the user interface:
the linked contact record that has been selected with a set of contact information associated with the contact;
an add link icon to enable adding one or more links to source contact records;
representations of one or more source contacts records, the one or more source contact records being displayed contemporaneously with the set of contact information being displayed for the linked contact record; and
a link status icon for each source contact record of the one or more source contacts, the link status icon comprising a first icon when the source contact record is linked to the linked contact record and a second icon when the source contact is unlinked to the linked contact record, wherein an unlinked source contact that was previously linked to the linked contact record is maintained as a contact associated with the user and displayed in the user interface as one of the one or more source contacts,
wherein the plurality of linked source contact records of the contact comprises source contact records of the same contact,
wherein the input to enter a manage mode comprises selection of the visual indicator, and
wherein the indicated number of linked source contact records of the linked contact record is updated if the number of linked source contact records of the linked contact record is modified in the manage mode.

2. The method of claim 1, wherein selection of the linked contact record comprises selection of the linked contact record from a contact list displayed in the user interface.

3. The method of claim 2, further comprising displaying the linked contact record and the visual indicator of the linked contact record in a contact detail panel of the user interface after receiving selection of the linked contact record.

4. The method of claim 1, wherein the numeric value comprises a badge of the visual indicator of the linked contact record that indicates the number of linked source contact records of the linked contact record.

5. The method of claim 1, further comprising in the manage mode displaying in the user interface a linked contact record representation of the linked contact record and a plurality of source contact record representations corresponding to a plurality of source contact records that comprise the plurality of linked source contact records of the linked contact record.

6. The method of claim 5, wherein the plurality of source contact record representations corresponding to the plurality of source contact records are displayed as indented under the linked contact record representation.

7. The method of claim 5, further comprising displaying the linked contact record representation and the plurality of source contact record representations in a linked profile panel of the user interface.

8. The method of claim 1, further comprising in the manage mode displaying in the user interface an add link icon.

9. The method of claim 8, further comprising:
after receiving an input to select the add link icon and to select a new source contact record of the contact adding a link to the new source contact record to create a new linked contact record of the contact, the plurality of linked source contact records of the new linked contact record comprising the selected new source contact record; and
displaying the new linked contact record of the contact in the user interface.

10. The method of claim 9, the selection of the new source contact record of the contact further comprising:
in response to a received search term, performing a search for available source contact records of the contact; and
in response to selection of the new source contact record returned by the search, adding the link to the new source contact record to create the new linked contact record of the contact.

11. The method of claim 9, further comprising updating a visual indicator of the new linked contact record to reflect the new source contact record in the plurality of linked source contact records for the new linked contact record of the contact.

12. The method of claim 11, further comprising updating a badge of the visual indicator of the new linked contact record.

13. The method of claim 1, further comprising in the manage mode removing a link of a linked source contact record of the plurality of linked source contact records to the linked contact record.

14. The method of claim 13, wherein removing the link of the linked source contact record to the linked contact record further comprises:
a linked profile panel of the user interface in which a linked contact record representation of the linked contact record and a plurality of linked source contact record representations corresponding to the plurality of linked source contact records of the linked contact record are displayed with each linked source contact record representation of the plurality of linked source contact record representations having a displayed corresponding source contact record representation link icon that indicates the linked status of each of the linked source contact records, in response to selection of a source contact record representation link icon of a linked source contact record representation corresponding to a linked source contact record of the linked contact record removing the link of the selected source contact record to the linked contact record.

15. The method of claim 14, further comprising:
updating to unlinked the linked status of the source contact record representation link icon of the selected source contact record; and
displaying the updated source contact record representation link icon of the selected source contact record.

16. The method of claim 15, further comprising:
in response to selection of the updated source contact record representation link icon of the previously unlinked source contact record, restoring the link to the linked contact record of the previously unlinked source contact record; and
updating to linked the linked status of the source contact record representation link icon of the restored source contact record.

17. The method of claim 1, further comprising:
saving changes to the linked contact record of the contact made in the manage mode to create a changed linked contact record; and
displaying the changed linked contact record and a visual indicator of the changed linked contact record.

18. The method of claim 17, further comprising displaying the changed linked contact record and the visual indicator of the changed linked contact record in a contact detail panel of the user interface; and displaying a badge of the visual indicator of the changed linked contact record in the contact details panel of the user interface that indicates the number of source contact records of the plurality of linked source contact records that comprise the changed linked contact record.

19. The method of claim 17, further comprising:
exiting the manage mode.

20. The method of claim 1, wherein the visual indicator comprises a link icon.

21. The method of claim 20, wherein receiving an input to enter the manage mode comprises receiving selection of the link icon.

22. A method of managing a linked contact record representative of contact information from multiple sources, comprising:

after receiving selection of a linked contact record of a contact, that includes a plurality of linked source contact records of the contact, displaying in a user interface the linked contact record and a visual indicator that the linked contact record has a linked status, where the visual indicator comprises one or more badges associated with the contact record sources; and after receiving an input to enter a manage mode:
entering the manage mode in which the linked contact record of the contact can be selectively managed,
displaying in the user interface a linked contact record representation of the linked contact record comprising a set of contact information associated with the contact, and further displaying a plurality of source contact record representations corresponding to a plurality of source contact records that comprise the plurality of linked source contact records of the linked contact record, the plurality of source contact record representations being displayed contemporaneously with the linked contact record representation of the linked contact record, and
displaying for each source contact record representation a source contact record representation a link icon that indicates a link status of the source contact record represented by the source contact record representation to the linked contact record, where the link status icon comprises a first icon when the source contact record is linked to the linked contact record and a second icon when the source contact is unlinked to the linked contact record, wherein an unlinked source contact that was previously linked to the linked contact record is maintained as a contact associated with the user and displayed in the user interface as one of the one or more source contacts, and
wherein the plurality of linked source contact records of the contact comprises source contact records of the same contact.

23. The method of claim 22, wherein the link status of the source contact record representation link icon for each linked source contact record of the plurality of linked source contact records is linked.

24. The method of claim 23, wherein the link status of the source contact record representation link icons of the plurality of source contact record representations corresponding to the plurality of source contact records other than the plurality of linked source contact records is unlinked.

25. The method of claim 22, wherein the link status of the source contact record to the linked contact record indicated by the source contact record representation link icon is linked or unlinked.

26. A system, comprising:
a processor; and
a contacts database coupled to the processor in which a plurality of contacts about the plurality of contacts are stored, the processor and contacts database configured to:
after receiving selection of a linked contact record of a contact, that includes a plurality of linked source contact records of the contact, display in a user interface the linked contact record and a visual indicator that the linked contact record has a linked status;
display a badge of the visual indicator with the linked contact record in the contact details panel of the user interface, wherein the badge of the visual indicator indicates the number of linked source contact records of the linked contact record;
after receiving an input to enter a manage mode, enter the manage mode in which the linked contact record of the contact can be selectively managed;
after entering the manage mode, display in the user interface a linked contact record representation of the linked contact record comprising a set of contact information associated with the contact, and further display a plurality of source contact record representations corresponding to a plurality of source contact records that comprise the plurality of linked source contact records of the linked contact record, the plurality of source contact record representations being displayed contemporaneously with the linked contact record representation of the linked contact record, wherein
a link status icon is displayed for each of the plurality of source contact record representations, the link status icon comprising a first icon when the source contact record corresponding to the source contact record representation is linked to the linked contact record and a second icon when the source contact record corresponding to the source contact record representation is unlinked to the linked contact record; and
after receiving an input to unlink a previously linked source contact record, displaying a representation of the previously linked source contact record as one of the plurality of source contact record representations together with the second icon indicative that the status of the source contact record is unlinked.

27. The system of claim 26, wherein the processor and the contacts database are further configured to:
provide for selection of the linked contact record from a contact list displayed in the user interface and display the linked contact record and the visual indicator of the linked contact record in a contact detail panel of the user interface after receiving selection of the linked contact record.

28. The system of claim 26, wherein the processor and the contacts database are further configured to:
in the manage mode display in the user interface an add link icon; and
after receiving an input to select the add link icon and to select a new source contact record of the contact, add a link to the new source contact record to create a new linked contact record of the contact, the plurality of linked source contact records of the new linked contact record comprising the selected new source contact record; and display the new linked contact record of the contact in the user interface.

29. The system of claim 26, wherein the processor and the contacts database are further configured to:

in the manage mode remove a link of a linked source contact record of the plurality of linked source contact records to the linked contact record.

30. The system of claim 29, wherein the processor and the contacts database are further configured to:

in a linked profile panel of the user interface in which a linked contact record representation of the linked contact record and a plurality of linked source contact record representations corresponding to the plurality of linked source contact records of the linked contact record are displayed with each linked source contact record representation of the plurality of linked source contact record representations having a displayed corresponding source contact record representation link icon that indicates the linked status of each of the linked source contact records, in response to selection of a source contact record representation link icon of a linked source contact record representation corresponding to a linked source contact record of the linked contact record remove the link of the selected source contact record to the linked contact record.

31. The system of claim 30, wherein the processor and the contacts database are further configured to:

update to unlinked the linked status of the source contact record representation link icon of the selected source contact record; and display the updated source contact record representation link icon of the selected source contact record.

32. The system of claim 31, wherein the processor and the contacts database are further configured to:

in response to selection of the updated source contact record representation link icon of the previously unlinked source contact record, restore the link to the linked contact record of the previously unlinked source contact record; and update to linked the linked status of the source contact record representation link icon of the restored source contact record.

33. The system of claim 26, wherein the processor and the contacts database are further configured to:

save changes to the linked contact record of the contact made in the manage mode to create a changed linked contact record; and display the changed linked contact record and a visual indicator of the changed linked contact record.

34. The system of claim 33, wherein the processor and the contacts database are further configured to:

exit the manage mode.

35. The system of claim 26, wherein the visual indicator comprises a link icon.

36. The system of claim 35, wherein receiving an input to enter the manage mode comprises receiving selection of the link icon.

37. A non-transitory computer-readable medium having computer-executable instructions for causing a server comprising a processor and an associated contacts database to manage a linked contact record representative of contact information from multiple sources, by performing a method comprising:

after receiving selection of a linked contact record of a contact, that includes a plurality of linked source contact records of the contact, displaying in a user interface the linked contact record and a visual indicator indicating that the linked contact record has a linked status and indicating the number of linked source contact records of the linked contact record; and after receiving an input to enter a manage mode, entering the manage mode in which the linked contact record of the contact can be selectively managed, by adding or removing links to source contact records, and displaying in the user interface:

the linked contact record that has been selected with a set of contact information associated with the contact;

an add link icon to enable adding one or more links to source contact records;

representations of one or more source contacts records the one or more source contact records being displayed contemporaneously with the set of contact information being displayed for the linked contact record; and a link status icon for each source contact record of the one or more source contacts, the link status icon comprising a first icon when the source contact record is linked to the linked contact record and a second icon when the source contact is unlinked to the linked contact record, wherein an unlinked source contact that was previously linked to the linked contact record is maintained as a contact associated with the user and displayed in the user interface as one of the one or more source contacts, wherein the plurality of linked source contact records of the contact comprises source contact records of the same contact, wherein the input to enter a manage mode comprises selection of the visual indicator, and wherein the indicated number of linked source contact records of the linked contact record is updated if the number of linked source contact records of the linked contact record is modified in the manage mode.

\* \* \* \* \*